(12) United States Patent
Shimotsu

(10) Patent No.: US 10,554,840 B2
(45) Date of Patent: Feb. 4, 2020

(54) IMAGE FORMING APPARATUS AND NON-TRANSITORY COMPUTER READABLE RECORDING MEDIUM

(71) Applicant: KYOCERA Document Solutions Inc., Osaka-shi, Osaka (JP)

(72) Inventor: Yuki Shimotsu, Osaka (JP)

(73) Assignee: KYOCERA DOCUMENT SOLUTIONS INC., Osaka (JP)

(\*) Notice: Subject to any disclaimer, the term of this patent is extended or adjusted under 35 U.S.C. 154(b) by 0 days.

(21) Appl. No.: 16/255,061

(22) Filed: Jan. 23, 2019

(65) Prior Publication Data
US 2019/0245985 A1    Aug. 8, 2019

(30) Foreign Application Priority Data

Feb. 7, 2018   (JP) .................. 2018-019783

(51) Int. Cl.
*H04N 1/00*   (2006.01)
*H04N 1/21*   (2006.01)

(52) U.S. Cl.
CPC ....... *H04N 1/0092* (2013.01); *H04N 1/00917* (2013.01); *H04N 1/2158* (2013.01); *H04N 2201/0094* (2013.01)

(58) Field of Classification Search
CPC .............. H04N 1/0092; H04N 1/2158
See application file for complete search history.

(56) References Cited

U.S. PATENT DOCUMENTS

| | | | | |
|---|---|---|---|---|
| 2001/0033303 A1\* | 10/2001 | Anderson | ............. | G06T 3/0018 715/854 |
| 2006/0218482 A1\* | 9/2006 | Ralston | .................. | H03M 7/40 715/201 |
| 2007/0171489 A1\* | 7/2007 | Oyanagi | ............. | H04N 1/0044 358/518 |
| 2008/0068629 A1\* | 3/2008 | Oyanagi | ................ | G06K 15/02 358/1.9 |
| 2008/0239328 A1\* | 10/2008 | Mariotti | ................... | H04N 1/32 358/1.1 |
| 2009/0168882 A1\* | 7/2009 | Sadowski | ............ | H04N 19/176 375/240.16 |

(Continued)

FOREIGN PATENT DOCUMENTS

| | | |
|---|---|---|
| JP | 2008-062508 | 3/2008 |
| JP | 2008-067125 | 3/2008 |

(Continued)

*Primary Examiner* — Ted W Barnes
(74) *Attorney, Agent, or Firm* — Calfee, Halter & Griswold LLP

(57) ABSTRACT

An image forming apparatus includes a controller that operates as a memory device detection module that detects connection of the memory device to the port, a speculative process control module that, when the connection of the memory device is detected, reads sizes of the one or more image data items from the memory device, and causes the image processor to speculatively process the one or more image data items in a descending order of the sizes, and a job execution module that, when the job execution request is input, reads the speculatively-processed image data item from the storage device on a basis of the selection request, and outputs the speculatively-processed image data item in response to the job execution request.

7 Claims, 5 Drawing Sheets

(56) References Cited

U.S. PATENT DOCUMENTS

| | | | | |
|---|---|---|---|---|
| 2012/0056903 A1* | 3/2012 | Shinohara | | G06F 3/013 |
| | | | | 345/676 |
| 2013/0177069 A1* | 7/2013 | Sze | | H04N 19/91 |
| | | | | 375/240.02 |
| 2014/0368672 A1* | 12/2014 | Ralston | | H04N 19/40 |
| | | | | 348/207.1 |
| 2015/0264200 A1* | 9/2015 | Ando | | H04N 1/0097 |
| | | | | 358/1.15 |
| 2017/0359591 A1* | 12/2017 | Said | | H04N 19/44 |
| 2018/0139360 A1* | 5/2018 | Francois | | H04N 1/6061 |

FOREIGN PATENT DOCUMENTS

| | | | |
|---|---|---|---|
| JP | 2011-197951 | | 10/2011 |
| JP | 2011197951 A | * | 10/2011 |
| JP | 2015-176307 | | 10/2015 |

* cited by examiner

IMAGE FORMING APPARATUS AND NON-TRANSITORY COMPUTER READABLE RECORDING MEDIUM

INCORPORATION BY REFERENCE

This application claims the benefit of Japanese Priority Patent Application JP 2018-019783 filed Feb. 7, 2018, the entire contents of which are incorporated herein by reference.

FIELD

The present disclosure relates to an image forming apparatus capable of processing an image data item that an external memory device records, and forming an image. The present disclosure further relates to a non-transitory computer readable recording medium that records an image forming program.

BACKGROUND

There is known an image forming apparatus that speculatively processes an image.

It is desirable to make a technology of processing an image data item that an external memory device (for example, USB (Universal Serial Bus) memory) records and forming an image more and more user friendly.

SUMMARY

According to an embodiment of the present disclosure, there is provided an image forming apparatus, including:
a port capable of connecting to an external memory device recording one or more image data items;
an input device that receives input of a selection request and a job execution request from a user, the selection request being for selecting an image data item to be output out of the one or more image data items, the job execution request being for outputting the image data item specified in the selection request;
a storage device;
an image processor that
processes the image data item, and
writes the processed image data item in the storage device; and
a controller that operates as
a memory device detection module that detects connection of the memory device to the port,
a speculative process control module that, when the connection of the memory device is detected,
reads sizes of the one or more image data items from the memory device, and
causes the image processor to speculatively process the one or more image data items in a descending order of the sizes, and
a job execution module that, when the job execution request is input,
reads the speculatively-processed image data item from the storage device on a basis of the selection request, and
outputs the speculatively-processed image data item in response to the job execution request.

According to an embodiment of the present disclosure, there is provided a non-transitory computer readable recording medium that records an image forming program that causes a processor of an image forming apparatus including a port capable of connecting to an external memory device recording one or more image data items,
an input device that receives input of a selection request and a job execution request from a user, the selection request being for selecting an image data item to be output out of the one or more image data items, the job execution request being for outputting the image data item specified in the selection request,
a storage device, and
an image processor that
processes the image data item, and
writes the processed image data item in the storage device,
to operates as:
a memory device detection module that detects connection of the memory device to the port;
a speculative process control module that, when the connection of the memory device is detected,
reads sizes of the one or more image data items from the memory device, and
causes the image processor to speculatively process the one or more image data items in a descending order of the sizes; and
a job execution module that, when the job execution request is input,
reads the speculatively-processed image data item from the storage device on a basis of the selection request, and
outputs the speculatively-processed image data item in response to the job execution request.

These and other objects, features and advantages of the present disclosure will become more apparent in light of the following detailed description of best mode embodiments thereof, as illustrated in the accompanying drawings.

DETAILED DESCRIPTION

Hereinafter, an embodiment of the present disclosure will be described with reference to the drawings.

1. HARDWARE CONFIGURATION OF IMAGE FORMING APPARATUS

Figure 1:
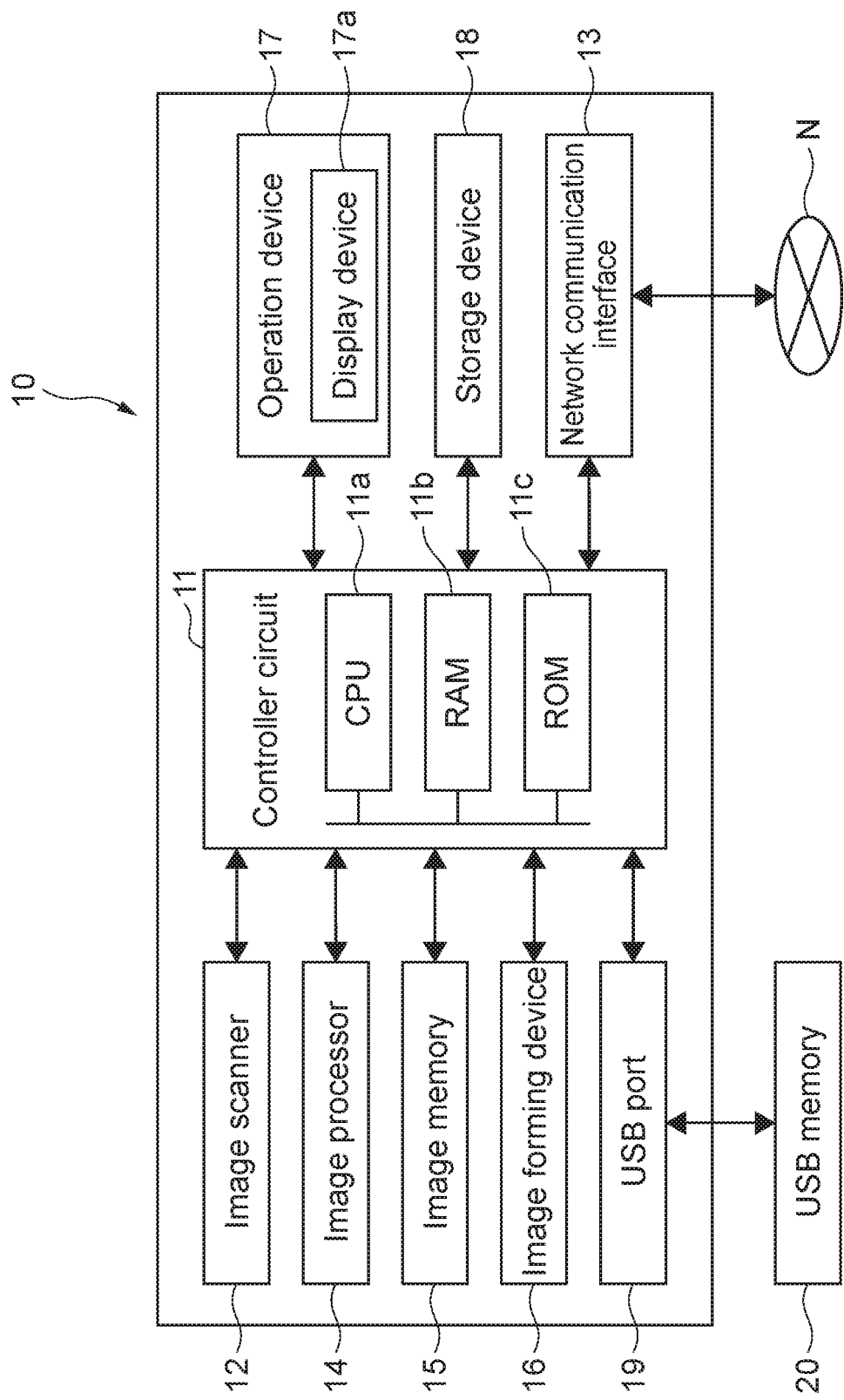
FIG. 1 shows a hardware configuration of an image forming apparatus according to an embodiment of the present disclosure.

FIG. 1 shows a hardware configuration of an image forming apparatus according to an embodiment of the present disclosure.

The image forming apparatus 10 of the present embodiment is an MFP (Multifunction Peripheral), and will be referred to as the MFP 10 hereinafter. The MFP 10 includes a controller circuit 11. The controller circuit 11 includes a CPU 11a(Central Processing Unit), i.e., a processor, a RAM 11b(Random Access Memory), a ROM 11c (Read Only Memory), i.e., a memory, dedicated hardware circuits, and the like and performs overall operational control of the MFP 10. A computer program that causes the MFP 10 to operate as the respective functional units (to be described later) is stored in a non-transitory computer readable recording medium such as a ROM.

The controller circuit 11 is connected to an image scanner 12, an image processor 14, an image memory 15, an image forming device 16, an operation device 17, a storage device 18, a network communication interface 13, a USB port 19, and the like. The controller circuit 11 performs operational control of the respective devices connected thereto and sends/receives signals and data to/from those devices.

According to job execution instructions input by a user via the operation device 17 or a personal computer (not shown) connected to a network, the controller circuit 11 controls drive and processing of mechanisms requisite for executing operational control of functions such as a scanner function, a printing function, and a copy function.

The image scanner 12 reads an image from a document.

The image processor 14 processes an image data item. Specifically, the image processor 14 rasterizes an image data item to thereby generate a rasterized data item (specifically, bitmap data item). The image processor 14 converts colors of the rasterized data item to thereby generate a color-converted data item (specifically, data of respective CMYK colors). The image processor 14 further processes the color-converted data item as necessary. The image processor 14 records the respective generated data items in the storage device 18.

The image memory 15 includes an area that temporarily stores data of a document image read by the image scanner 12 or data to be printed by the image forming device 16.

The image forming device 16 (printer) forms an image of image data and the like read by the image scanner 12.

The operation device 17 includes a touch panel device and an operation key device that accept user's instructions on various operations and processing executable by the MFP 1. The touch panel device includes a display device 17a such as an LCD (Liquid Crystal Display) and an organic EL (Electroluminescence) display including a touch panel. The operation device 17 is an embodiment of an input device. For example, a microphone may be provided as a device in which a user inputs an instruction.

The network communication interface 13 is an interface used for connecting to the network N.

The storage device 18 is a large-volume nonvolatile storage device such as an HDD (Hard Disk Drive), for example, that stores a document image read by the image scanner 12, and the like. Further, the storage device 18 may be a semiconductor memory such as a RAM.

The USB port 19 is a port to which the USB memory 20 is connectable. The USB memory 20 is an external memory device that records one or more image data items.

2. FUNCTIONAL CONFIGURATION OF IMAGE FORMING APPARATUS

Figure 2:
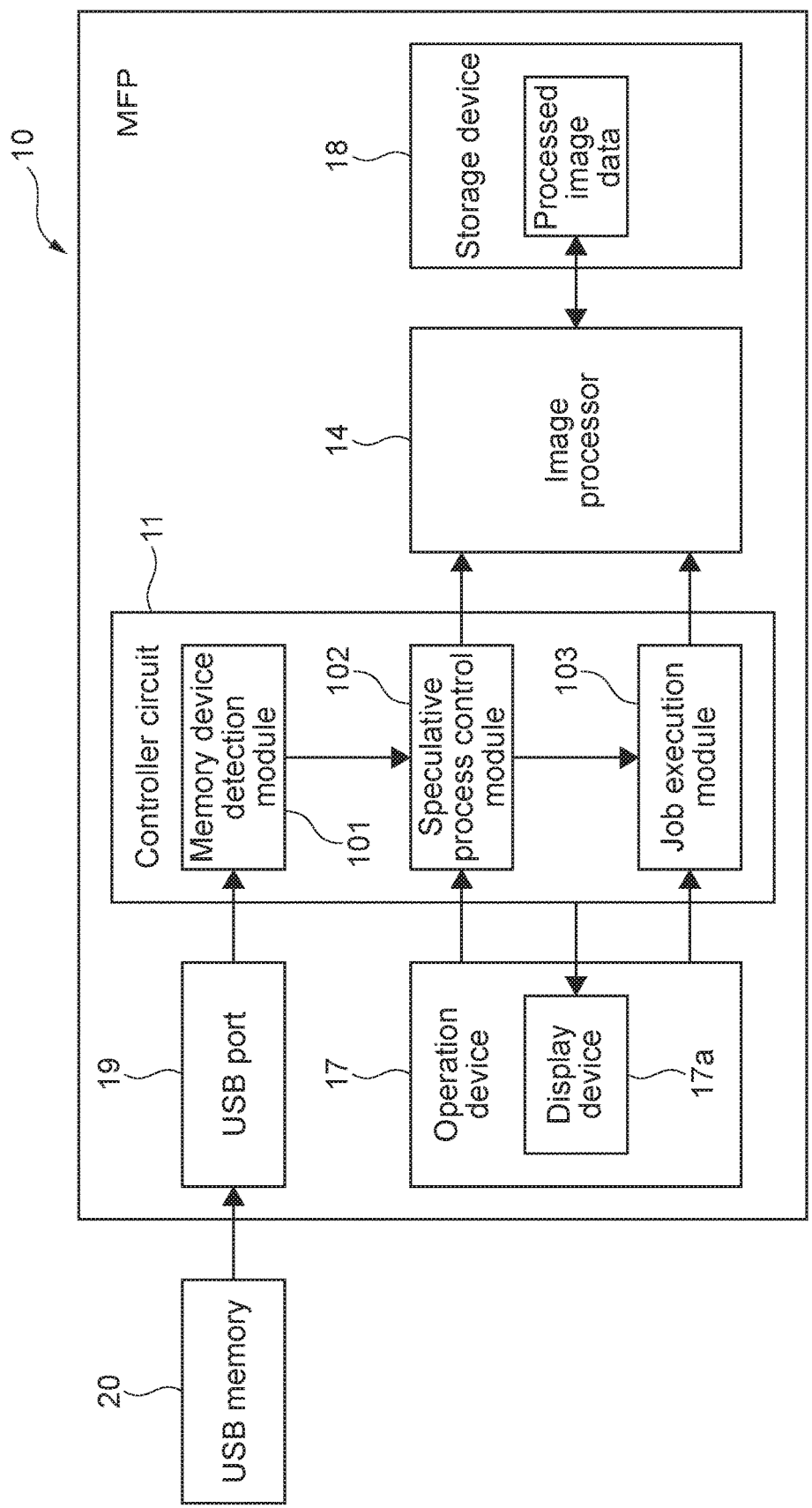
FIG. 2 shows a functional configuration of the image forming apparatus.

FIG. 2 shows a functional configuration of the image forming apparatus.

The CPU 11a of the controller 11 of the MFP 10 loads an information processing program recorded in the ROM 11c in the RAM 11b and executes the program to thereby operate as the memory device detection module 101, the speculative process control module 102, and the job execution module 103.

The memory device detection module 101 detects connection of the USB memory 20 to the USB port 19.

The speculative process control module 102, when the connection of the USB memory 20 is detected, causes the image processor 14 to speculatively process the one or more image data items recorded in the USB memory 20.

The job execution module 103, when the job execution request is input, reads the speculatively-processed image data item from the storage device 18, and outputs the speculatively-processed image data item in response to the job execution request.

3. OPERATIONAL FLOW OF IMAGE FORMING APPARATUS

Figure 3:
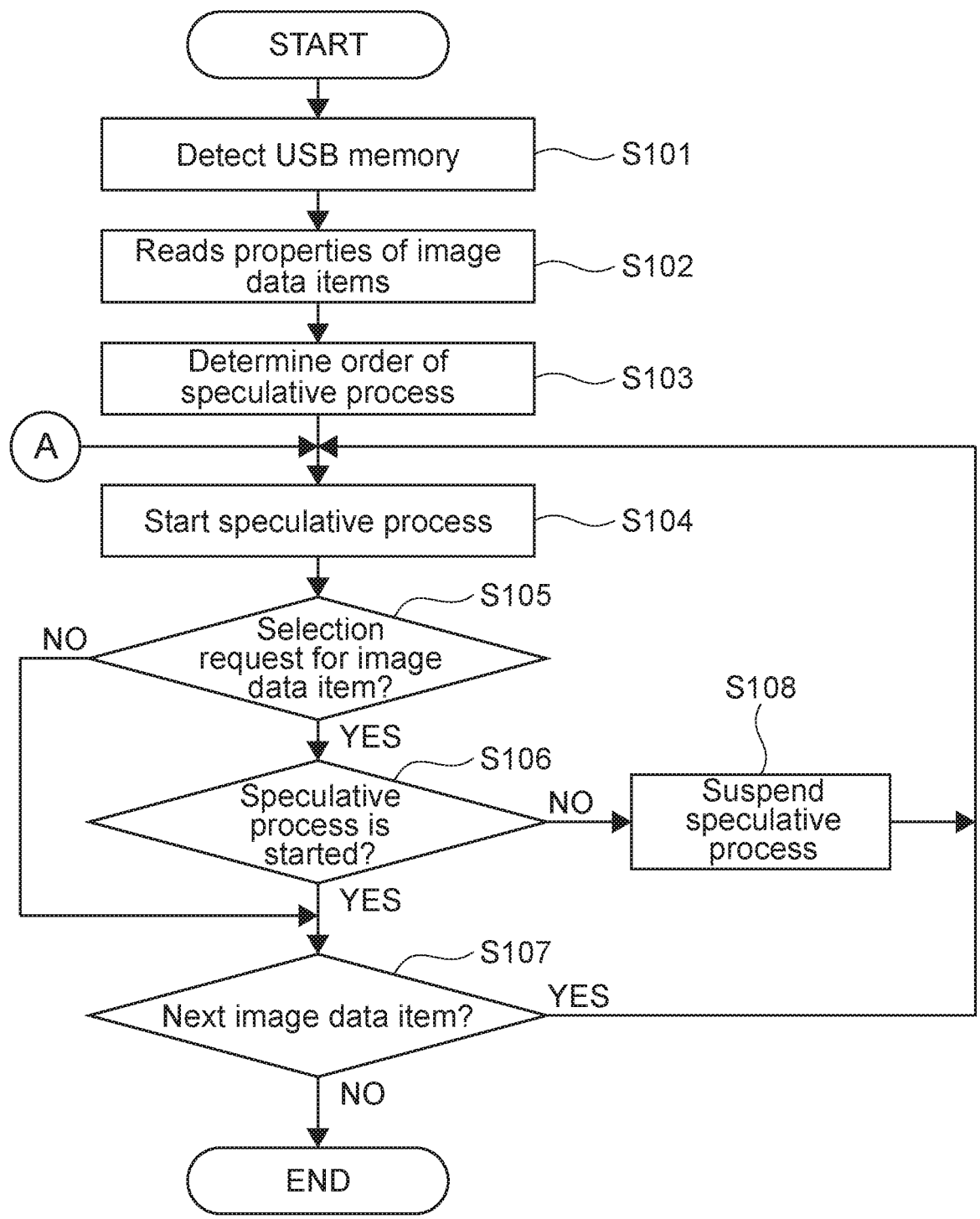
FIG. 3 shows an operational flow of a speculative process executed by the image forming apparatus.

FIG. 3 shows an operational flow of a speculative process executed by the image forming apparatus.

A user inserts the USB memory 20 in the USB port 19. The memory device detection module 101 detects connection of the USB memory 20 to the USB port 19 (Step S101).

Then, the speculative process control module 102 reads properties of one or more image data items recorded in the USB memory 20 (Step S102). Specifically, the speculative process control module 102 reads, as the properties, at least the name, the size, and the update date-and-time of each image data item. The speculative process control module 102 determines the order of speculatively processing the image data items (Step S103). In the present disclosure, "to speculatively process" means to speculatively (i.e., before obtaining a job execution instruction) execute processes (at least generation of a rasterized data item and generation of a color-converted data item) that the image processor 14 executes to form (print) an image on the basis of an image data item.

Specific examples (1) to (4) of "the order of speculatively processing the image data items" determined by the speculative process control module 102 will be described. (1) The speculative process control module 102 may determine, as the order of speculatively processing the image data items, the descending order (it means the order from large to small, and the same applies to the following description) of the sizes of the image data items. (2) Alternatively, the speculative process control module 102 may determine, as the order of speculatively processing the image data items, the descending order (it means the order from new to old, and the same applies to the following description) of the update date-and-time of the image data items. (3) Alternatively, the speculative process control module 102 may determine, as the order of speculatively processing the image data items, the descending order of sizes of image data items in a first group of image data items, update date-and-time of each of the image data items in the first group being same as a threshold and newer than the threshold, and subsequently, the descending order of sizes of image data items in a second group of image data items, update date-and-time of each of the image data items in the second group being older than the threshold, the threshold being update date-and-time of a specific image data item. (4) Alternatively, the speculative process control module 102 may determine, as the order of speculatively processing the image data items, the descending order of sizes of image data items in a third group of image data items, the third group including a certain number (for example, half) of image data items in a descending order of update date-and-time, and subsequently, the descending order of sizes of rest image data items.

The speculative process control module 102 reads the image data item, which has the highest order out of the determined order, from the USB memory 20 via the USB port 19. The speculative process control module 102 causes the image processor 14 to start the speculative process (Step S104). As the speculative process, the image processor 14 rasterizes the image data item to thereby generate a rasterized data item (specifically, bitmap data item). The image processor 14 writes the generated rasterized data item in the storage device 18. Subsequently, the image processor 14 converts colors of the rasterized data item to thereby generate a color-converted data item (specifically, data of respective CMYK colors). The image processor 14 writes the generated color-converted data item in the storage device 18. Note that, as a parameter such as resolution, a default value set in the MFP 10, a default value set for a user who is logging in to the MFP 10, or the like may be used. If the speculative process control module 102 does not detect that a selection request for selecting an image data item recorded in the USB memory 20 is input in the operation device 17 when the image processor 14 is speculatively processing the one image data item (Step S105, NO), the image processor 14 completes the speculative process of the one image data item without interruption. After that, if there is an image data item of the next order (Step S107, YES), the speculative process control module 102 reads the image data item of the next order from the USB memory 20 via the USB port 19. The speculative process control module 102 causes the image processor 14 to start the speculative process (Step S104).

By the way, in parallel to the aforementioned speculative process, after a user inserts the USB memory 20 in the USB port 19, the user operates the operation device 17 (typically, touch panel including the display device 17a) of the MFP 10. In order to output (print) an image data item recorded in the USB memory 20, the user inputs a USB memory selection request in the operation device 17 from a menu window displayed on the display device 17a, and inputs a selection request for selecting an image data item (specifically, name of image data item) recorded in the USB memory 20 to be output in the operation device 17.

The speculative process control module 102 detects that a selection request for selecting an image data item recorded in the USB memory 20 is input in the operation device 17 (Step S105, YES). If a user inputs a selection request for selecting an image data item, then it means that the image data item is highly likely to be output (printed). Therefore, if the speculative process control module 102 is yet to start speculatively processing the image data item specified in the selection request (Step S106, NO), the speculative process control module 102 causes the image processor 14 to suspend the speculative process that the image processor 14 is executing (Step S108), and causes the image processor 14 to start speculatively processing the image data item specified in the selection request (Step S104).

After the speculative process of the image data item specified in the selection request is completed, in Step S107, the speculative process control module 102 determines that the image data item, of which speculative process is suspended (Step S108), is the image data item of the next order (Step S107, YES). The speculative process control module 102 causes the image processor 14 to restart the suspended speculative process (Step S104).

Meanwhile, if the speculative process control module 102 has already started speculatively processing the image data item specified in the selection request but the speculative process is not completed (Step S106, YES), the speculative process control module 102 causes the image processor 14 to continue the speculative process. After the speculative process is completed, the process proceeds to Step S107.

Further, if the speculative process control module 102 has already completed the speculative process of the image data item specified in the selection request (Step S106, YES), the process proceeds to Step S107. If there is an image data item of the next order (Step S107, YES), the speculative process control module 102 reads the image data item of the next order from the USB memory 20 via the USB port 19. The speculative process control module 102 causes the image processor 14 to start the speculative process (Step S104).

If the speculative process of the image data item of the last order is completed (Step S107, NO), the speculative process control module 102 finishes the speculative process.

Figure 4:
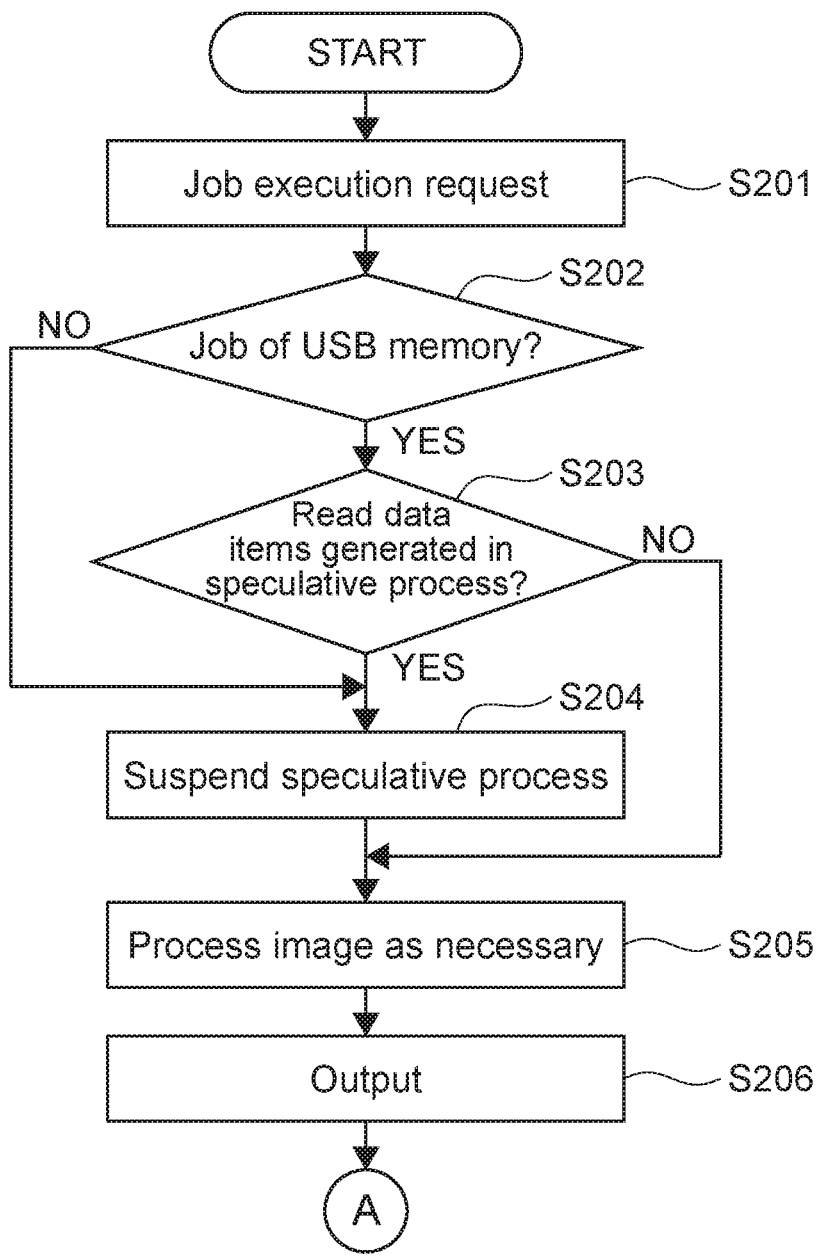
FIG. 4 shows an operational flow of executing a job by the image forming apparatus.

FIG. 4 shows an operational flow of executing a job by the image forming apparatus.

The job execution module 103 detects that a job execution request is input in the operation device 17 (Step S201). The job execution module 103 determines whether or not the job execution request is for a job in relation with the USB memory 20 (Step S202).

Specifically, the job execution module 103 determines that the job execution request is an execution request for executing a job of outputting (printing) the image data item recorded in the USB memory 20 specified in the selection request (Step S105, YES) (Step S202, YES). Alternatively, the job execution module 103 determines that the job execution request is an execution request for executing a job, which has no relation with image data items recorded in the USB memory 20 (for example, execution request of a job input from a personal computer) (Step S202, NO).

The job execution module 103 determines that the job execution request is an execution request for executing a job of outputting (printing) the image data item recorded in the USB memory 20 (Step S202, YES). Then, the job execution module 103 reads the data items (rasterized data item and color-converted data item) of the image data item specified in the selection request (Step S105, YES), which are generated in the speculative process, from the storage device 18 (Step S203, YES). If the image processor 14 is executing the speculative process, the job execution module 103 causes the image processor 14 to suspend the speculative process (Step S204). The job execution module 103 causes the image processor 14 to further process the data read from the storage device 18, which is generated in the speculative process (Step S203, YES), as necessary (for example, 2 in 1, i.e., N-up, scaling, margin, grayscale, rotating, etc.) (Step S205).

The processing of the data generated in the speculative process (Step S205) will be described specifically. The image processor 14 has written a plurality of stages of data items (rasterized data item and color-converted data item), which are generated in the speculative process, in the storage device 18. Therefore, in response to the job execution request, the job execution module 103 executes the job by using the data of the last stage out of the plurality of stages of data items (rasterized data item and color-converted data item) which are available. For example, if the job is merely a print job with default parameters (resolution, color mode, etc.) or a job of rotation of an image, the job execution module 103 may process the image by using the color-converted data item of the last stage. Alternatively, if the job specified in the job execution request is a black-and-white print job, the job execution module 103 cannot use the color-converted data item of the last stage (specifically, data of respective CMYK colors). Therefore, the job execution module 103 may process the image by using the data of the last stage out of the available data (rasterized data item whose stage is before the stage of color-converted data item). Further, if the rasterized data item is generated but the color-converted data item is not generated, the job execution module 103 may process the image by using the rasterized data item.

Meanwhile, in some cases, the data (rasterized data item and color-converted data item) of the selected image data item generated in the speculative process may not be recorded in the storage device 18 (Step S203, NO). The speculative process of the selected image data item is always started without fail (Step S104 to Step S108). However, if the size of the image data item is large, for example, generation of the rasterized data item is not completed. In this case, the job execution module 103 causes the image processor 14 to continue the processing of the selected image data item (Step S205). The job execution module 103 outputs (prints) the image data item, whose image processing is completed (Step S206).

Meanwhile, the job execution module 103 determines that the job execution request is not an execution request for executing a job of outputting (printing) the image data item recorded in the USB memory 20 (Step S202, NO). The job execution module 103 causes the image processor 14 to suspend the speculative process that the image processor 14 is executing (Step S204), processes an image in response to the job execution request (Step S205), and outputs (prints) the image data item, whose image processing is completed (Step S206).

If the job execution module 103 completes the job in response to the job execution request (Step S206), the job execution module 103 requests the speculative process control module 102 to restart the suspended speculative process (Step S104).

Figure 5:
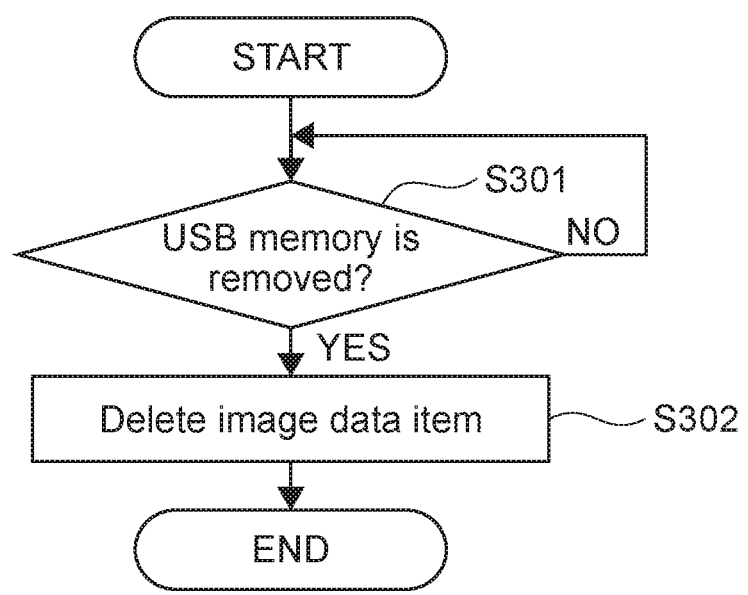
FIG. 5 shows an operational flow of deleting data generated in a speculative process by the image forming apparatus.

FIG. 5 shows an operational flow of deleting data generated in a speculative process by the image forming apparatus.

The memory device detection module 101 detects that the USB memory 20 is removed from the USB port 19 (Step S301, YES). Then, the speculative process control module 102 deletes the processed image data item from the storage device 18 (Step S302).

4. CONCLUSION

When an MFP forms (prints) images on the basis of a large number of image data items or image data items having a large volume, it takes time to process the images and generate files to be output. As a result, it takes time for the MFP to complete formation of the images after obtaining an image formation request from a user. By the way, when an MFP forms (prints) an image on the basis of an image data item recorded in an external memory device such as a USB memory, the MFP at least executes the following operations. Firstly, a user inserts a USB memory into a USB port of an MFP. Next, the MFP detects the USB memory, reads names and the like of image data items recorded in the USB memory, and displays the names and the like on a display device. The user selects an image data item to be output from the displayed names, and inputs an image formation request. Then, at last, the MFP starts processing the selected image data item. Therefore, especially if the MFP forms (prints) an image on the basis of an image data item recorded in an external memory device such as a USB memory, a user may feel that it takes longer time to complete formation of the image.

In view of the aforementioned circumstances, according to the present embodiment, if connection of the USB memory 20 is detected (Step S101), the speculative process control module 102 reads sizes of image data items from the USB memory 20 (Step S102), and causes the image processor 14 to speculatively process the image data items (Step S104). If a job execution request is input (Step S201), the job execution module 103 reads speculatively-processed image data items from the storage device 18 (Step S203), and outputs speculatively-processed image data items in response to the job execution request (Step S205).

As a result, it is possible to use speculatively-processed image data items generated before the job execution request us input. Therefore the time from input of a job execution request to completion of forming an image is shortened.

Specific examples (1) to (4) of "the order of speculatively processing the image data items" determined by the speculative process control module 102 are as follows. (1) The descending order of the sizes of the image data items. (2) The descending order of the update date-and-time of the image data items. (3) The descending order of sizes of image data items in a first group of image data items, update date-and-time of each of the image data items in the first group being same as a threshold and newer than the threshold, and subsequently, the descending order of sizes of image data items in a second group of image data items, update date-and-time of each of the image data items in the second group being older than the threshold, the threshold being update date-and-time of a specific image data item. (4) The descending order of sizes of image data items in a third group of image data items, the third group including a certain number of image data items in a descending order of update date-and-time, and subsequently, the descending order of sizes of rest image data items.

In the aforementioned cases (1), (3), and (4), image data items are speculatively processed in the descending order of the sizes. It means that image data items are speculatively processed in the order of time periods that it takes to process the images. As a result, when a job execution request to output an image data item having a large size is input, it is highly likely that the image data item is already speculatively processed. If the image data item is already speculatively processed when the job execution request is input, there is no need to process the image data item having the large size after the job execution request is input. As a result, the time from input of a job execution request to completion of forming an image is shortened. Further, in the aforementioned cases (2), (3), and (4), the order of the speculative process is determined also on the basis of update date-and-time of image data items. If a newer image data item is highly likely to be output, it is highly likely that the image data item is already speculatively processed when a job execution request is input.

According to the present embodiment, if a selection request for selecting an image data item to be output is input when the image processor 14 is executing speculative process (Step S105, YES), and if the speculative process control module 102 is yet to start speculatively processing the image data item specified in the selection request (Step S106, NO), the speculative process control module 102 causes the image processor 14 to suspend the speculative process that the image processor 14 is executing (Step S108), and causes the image processor 14 to start speculatively processing the image data item specified in the selection request (Step S104).

If a user inputs a selection request for selecting an image data item, then it means that the image data item is highly likely to be output (printed). Therefore it is possible to start speculatively processing the image data item, which is highly likely to be output, before a job execution request is input.

According to the present embodiment, The image processor 14 has written a plurality of stages of data items (rasterized data item and color-converted data item), which are generated in the speculative process, in the storage device 18. Therefore, in response to the job execution request, the job execution module 103 executes the job by using the data of the last stage out of the plurality of stages of data items (rasterized data item and color-converted data item) which are available.

As a result, the number of processes executed after a job execution request may be reduced as small as possible.

According to the present embodiment, if it is detected that the USB memory 20 is removed from the USB port 19 (Step S301, YES), the speculative process control module 102 deletes the processed image data item from the storage device 18 (Step S302).

As a result, spaces of the storage device 18 are not consumed unnecessarily by storing unnecessary data.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
   a port capable of connecting to an external memory device recording one or more image data items;
   an input device that receives input of a selection request and a job execution request from a user, the selection request being for selecting an image data item to be output out of the one or more image data items, the job execution request being for outputting the image data item specified in the selection request;
   a storage device;
   an image processor that
      processes the image data item, and
      writes the processed image data item in the storage device; and
   a controller that operates as
      a memory device detection module that detects connection of the memory device to the port,
      a speculative process control module that, when the connection of the memory device is detected,
         reads sizes of the one or more image data items from the memory device, and
         causes the image processor to speculatively process the one or more image data items in a descending order of the sizes, and
      a job execution module that, when the job execution request is input,
         reads the speculatively-processed image data item from the storage device on a basis of the selection request, and
         outputs the speculatively-processed image data item in response to the job execution request.

2. The image forming apparatus according to claim 1, wherein
   the speculative process control module,
      if the selection request is input in the input device when the image processor is executing the speculative process, and
      if the speculative process control module is yet to start speculatively processing the image data item specified in the selection request,
      causes the image processor to suspend the speculative process that the image processor is executing, and
      causes the image processor to start speculatively processing the image data item specified in the selection request.

3. The image forming apparatus according to claim 1, wherein
   the image processor writes a plurality of stages of data items generated in the speculative process in the storage device, and
   the job execution module executes a job by using a last stage of data item out of the plurality of stages of data items available in response to the job execution request.

4. The image forming apparatus according to claim 1, wherein
   the speculative process control module causes the image processor to speculatively process the one or more image data items,
      in a descending order of sizes of image data items in a first group of image data items, update date-and-time of each of the image data items in the first group being same as a threshold and newer than the threshold, and subsequently, in a descending order of sizes of image data items in a second group of image data items, update date-and-time of each of the image data items in the second group being older than the threshold, the threshold being update date-and-time of a specific image data item, or
      in a descending order of sizes of image data items in a third group of image data items, the third group including a certain number of image data items in a descending order of update date-and-time, and subsequently, in a descending order of sizes of rest image data items.

5. The image forming apparatus according to claim 1, wherein
   the job execution module,
      if the job execution request is input in the input device when the image processor is executing the speculative process,
      suspends the speculative process that the image processor is executing, and
      executes the job in response to the job execution request.

6. The image forming apparatus according to claim 1, wherein
   the speculative process control module, if the memory device detection module detects that the memory device is removed from the port, deletes the processed image data item from the storage device.

7. A non-transitory computer readable recording medium that records an image forming program that causes a processor of an image forming apparatus including
   a port capable of connecting to an external memory device recording one or more image data items,
   an input device that receives input of a selection request and a job execution request from a user, the selection request being for selecting an image data item to be output out of the one or more image data items, the job execution request being for outputting the image data item specified in the selection request,
   a storage device, and
   an image processor that
      processes the image data item, and writes the processed image data item in the storage device, to operates as:
- a memory device detection module that detects connection of the memory device to the port;
- a speculative process control module that, when the connection of the memory device is detected,
  - reads sizes of the one or more image data items from the memory device, and
  - causes the image processor to speculatively process the one or more image data items in a descending order of the sizes; and
- a job execution module that, when the job execution request is input,
  - reads the speculatively-processed image data item from the storage device on a basis of the selection request, and
  - outputs the speculatively-processed image data item in response to the job execution request.

* * * * *